United States Patent [19]

Allen

[11] Patent Number: 5,103,908
[45] Date of Patent: Apr. 14, 1992

[54] METHOD FOR CEMENTING A WELL

[75] Inventor: Thomas E. Allen, Comanche, Okla.

[73] Assignee: Halliburton Company, Duncan, Okla.

[21] Appl. No.: 715,415

[22] Filed: Jun. 14, 1991

Related U.S. Application Data

[62] Division of Ser. No. 412,231, Sep. 21, 1989.

[51] Int. Cl.$^5$ .................................................. E21B 33/14
[52] U.S. Cl. ...................................... 166/285; 366/17; 366/137
[58] Field of Search ................. 166/285, 242, 293; 366/2, 15, 17, 18, 136, 137, 142, 28

[56] References Cited

U.S. PATENT DOCUMENTS

| | | | |
|---|---|---|---|
| 1,306,210 | 6/1919 | Zucker | 137/605 |
| 1,429,574 | 9/1922 | England et al. | 366/177 |
| 2,743,909 | 5/1956 | Lawlor | 366/136 |
| 3,231,245 | 1/1966 | Harvey | 366/28 |
| 3,846,079 | 11/1974 | Alagy et al. | 366/136 X |
| 3,908,967 | 9/1975 | Merritt | 366/17 |
| 4,077,612 | 3/1978 | Ricciardi | 366/102 |
| 4,184,771 | 1/1980 | Day | 366/15 X |
| 4,327,759 | 5/1982 | Millis | 366/137 X |
| 4,654,802 | 3/1987 | Davis | 366/17 X |
| 4,764,019 | 8/1988 | Kaminski et al. | 366/15 |
| 4,830,505 | 5/1989 | Dunton et al. | 366/2 |
| 4,863,277 | 9/1989 | Neal et al. | 366/137 |
| 5,027,267 | 6/1991 | Pitts et al. | 366/17 X |

OTHER PUBLICATIONS

Halliburton Services publication entitled "Halliburton Modular Recirculating Cement Mixer (RCM TM) System", dated at least one year prior to Aug., 1989.
Byron Jackson Inc. brochure entitled "New BJ PSB Precision Slurry Blender", dated at least one year prior to Aug., 1989.
BJ-Titan publication entitled "The Ram—Recirculating Averaging Mixer for Consistent Slurry Weight", and attached BJ Hughes Product Information Equipment Specification entitled Dual RAM, dated at least one year prior to Aug., 1989.
Magcobar-Dresser publication entitled "The Magcobar Cementing System", dated at least one year prior to Aug., 1989.
The Western Company brochure entitled "Western Offshore Cementing Services", dated at least one year prior to Aug., 1989.

Primary Examiner—Stephen J. Novosad
Attorney, Agent, or Firm—James R. Duzan; E. Harrison Gilbert, III

[57] ABSTRACT

A mixing apparatus comprises two or more tubs in which mixtures can be mixed to obtain averaging of a particular property, such as density. Two recirculation lines are used. One recirculates between an initial mixing tub and a mixing inlet, and the other recirculates from the additional, secondary averaging tub(s) and the mixing inlet. Computer control responds to densities of fluids recirculated through both of the recirculation lines. In a preferred embodiment, the computer is also responsive to pressure of one of the inlet substances. In response to these measured inputs and other data entered through a data entry terminal, the computer generates control signals for controlling the inputs of both of two inlet substances. In a preferred embodiment, the apparatus and a corresponding method utilize displacement tanks both as averaging tubs and as conventional displacement tanks.

6 Claims, 7 Drawing Sheets

ENTER SYSTEM DESIGN PARAMETERS
AND CONTROL TUNING FACTORS:

- TUBV  (VOLUME OF PRIMARY MIXING TUB, BBL.)
- TUBV2 (VOLUME OF SECONDARY MIXING TUB, BBL.)
- RRP2  (RECIRCULATION/BOOST PUMP RATE, BPM.)
- K3    [(CEMENT VALVE POSITION UNIT)/(LB/SEC OF BULK DELIVERY)]
- PAR12 (CEMENT PROPORTIONAL COEFFICIENT)
- PAR13 (CEMENT INTEGRAL COEFFICIENT)
- PAR14 (CEMENT DIFFERENTIAL COEFFICIENT)
- TSAMP (CONTROL SAMPLE TIME, SEC)

ENTER JOB INPUT PARAMETERS:

- SLDYD  (SLURRY YIELD DESIGN POINT, $FT^3$/SK CMT)
- WTRGAL (WATER REQUIRED FOR SLURRY, GAL/SK.)
- CMTWT  (WEIGHT OF SACK OF CEMENT (W/O ADDITIVES), LB.)
- SPGR   (SPECIFIC GRAVITY OF MIX WATER)
- DENSN  (DESIRED MIX DENSITY, LB/GAL.)
- CTDNMX (MAXIMUM MIXING DENSITY, LB/GAL.)
- CTDNMN (MINIMUM MIXING DENSITY, LB/GAL.)
- SLR    (SLURRY MIX RATE, BBL/MIN.)

PERFORM INITIAL CALCULATIONS:

- WTRWT = SPGR * 8.345223 (WEIGHT OF WATER, LB/GAL.)
- PBWA  = (DENSN * SLDYD * 7.480519 – CMTWT – WTRGAL * WTRWT)/CMTWT (PERCENT BY WEIGHT OF ADDITIVES NOT IN CMTWT)
- ABVAD = (SLDYD * 7.480519 – WTRGAL – 3.6)/(PBWA * CMTWT) (ABSOLUTE VOLUME OF ADDITIVES)
- A = (3.6/CMTWT + ABVAD * PBWA)  ⎫
- B = 1.0 + PBWA                   ⎬ (SLURRY CONSTANTS)
- C = 1.0/(SPGR * 8.345223)        ⎭
- CWRMIN = (1.0 – CTDNMN * C)/(CTDNMN * (A/B) – 1.0) (CEMENT/WATER RATIO MINIMUM BASED ON CTDNMN)
- CWRMAX = (1.0 – CTDNMX * C)/(CTDNMX * (A/B) – 1.0) (CEMENT/WATER RATIO MAXIMUM BASED ON CTDNMX)

- TUBVF  = 5.61 * TUBV (PRIMARY TUB VOLUME IN $FT^3$)
- WRDN   = SLR * .093576 * (1.0/(SLDYD * CWRD)) (WATER RATE REQUIRED FOR SPECIFIED DESIGN DENSITY AND RATE, LB/SEC.)
- TUBVF2 = TUBV2 * 5.61 (SECONDARY TUB VOLUME IN $FT^3$)
- K4     = (RRP2 – SLR)/RRP2 (DENSITY FEEDBACK GAIN FACTOR)
- TUBVFP = TUBVF2 * K4 (CONSTANT FUNCTION OF K4)
- TOTVOL = TUBVF + TUBVFP (ADJUSTED VOLUME FACTOR)
- CWRD   = (1.0 – DENSN * C)/(DENSN * (A/B) – 1.0) (DESIRED CEMENT/WATER RATIO, LB/LB.)
- CMDN   = SLR * .093576/SLDYD (DESIRED CEMENT RATE, LB/SEC.)

FIG. 4A

PERFORM INITIAL CALCULATIONS: (CONTINUED)

PARPI2 = PARI2 * (15.945 - 1.79 * SLR + 0.0899 * SLR ** 2. - 0.00187 * SLR ** 3.)
PARII3 = PARI3 * SLR
PARDI4 = PARI4 * (35.64 - 4.87 * SLR + 0.2004 * SLR ** 2. - 0.0022 * SLR ** 3.)

---

SAMPLE MEASURED PARAMETERS AT INTERVAL TSAMP:

DENRS   (PRIMARY TUB RECIRCULATION DENSIMETER)
DENRSF  (SECONDARY TUB RECIRCULATION DENSIMETER)
WTRATE  (MIX WATER FLOWMETER)
PTNK    (INCOMING BULK DELIVERY PRESSURE)

AND CONTROL PRODUCTION OF SLURRY USING FOLLOWING:

(1)  CTOINT  = RSW(T. EQ. 0.0, 0.0, CMISAG) (PREVIOUS CEMENT INTEGRAL)
(2)  OCMTER  = RSW(T. EQ. 0.0, 0.0, CMESAG) (PREVIOUS CEMENT ERROR)
              (CTOINT & OCMTER ARE CURRENT VALUES FOR CEMENT
              INTEGRAL AND CEMENT ERROR UNTIL CLOCK FINISHES
              THE TSAMP TIME)
(3)  DELDN   = DENSN-DENRS+(DENSN-DENRSF)*(TUBV2/TUBV)*(RRP2-SLR)/
              RRP2 (DENSITY ERROR, LB/GAL)
(4)  CMTER   = DELDN*CMDN/(DENSN-8.3) (CEMENT ERROR, LB/SEC.)
(5)  CMISAG  = DELAY(CMTIMB, CMTIMI, 1.0, 1000) (CEMENT INTEGRAL,
              ONE-TSAMP-AGO)
(6)  CMTINT  = CTOINT + CMTER (CEMENT INTEGRAL)
(7)  CMTDIF  = CMTER - OCMTER (CEMENT DIFFERENTIAL)
(8)  CMESAG  = DELAY(CMTER, CMTERI, 1.0, 1000) (CEMENT ERROR,
              ONE-TSAMP-AGO)
(9)  CNCMER  = PARPI2 * CMTER (CEMENT PROPORTIONAL ERROR WITH GAIN)
(10) CNCINB  = PARII3 * CMTINT (CEMENT INTEGRAL ERROR WITH GAIN)
     DF      = ABS(DELDN) (ABSOLUTE VALUE OF DENSITY ERROR)
     PARI4P  = PARDI4 * (EXP(DF) - EXP(-DF))/(EXP(DF) + EXP(-DF) + 0.0001)
(11) CNCDIF  = PARI4P * CMTDIF (CEMENT DIFFERENTIAL ERROR WITH GAIN)
(12) CNCMRA  = CNCMER + CNCINB + CNCDIF (CEMENT CORRECTION, LB/SEC)
(13) CMTDT   = CMDN + CNCMRA (CORRECTED DESIRED CEMENT RATE)
(14) SLYDT   = SLR * .093576/(CMDN+CNCMRA) (YIELD TEST, FT³/LB)
(15) CWRTT   = C*B/(7.480519*SLYDT-A) (CEMENT/WATER TEST, LB/LB)
(16) CWRB    = BOUND(CWRMIN, CWRMAX, CWRTT) (CEMENT/WATER LIMITED, LB/LB)
(17) SLYDB   = (A/(B*7.480519))+.016048/CWRB (NEW YIELD, FT³/LB)
(18) BLKRAT  = (SLR/SLYDB) * .093576 (BULK RATE, LB/SEC)
(19) CMVLPO  = BLKRAT * K3 * (2. - PTNK/30) (CEMENT VALVE POSITION)
(20) WTRAT   = BLKRAT/CWRB (REQUIRED WATER RATE, LB/SEC)
(21) NDENS   = (WTRAT+CMVLPO)/((WTRAT/WTRWT)+(CMVLPO/26.111))
              (INCOMING DENSITY, LB/GAL)

FIG. 4B

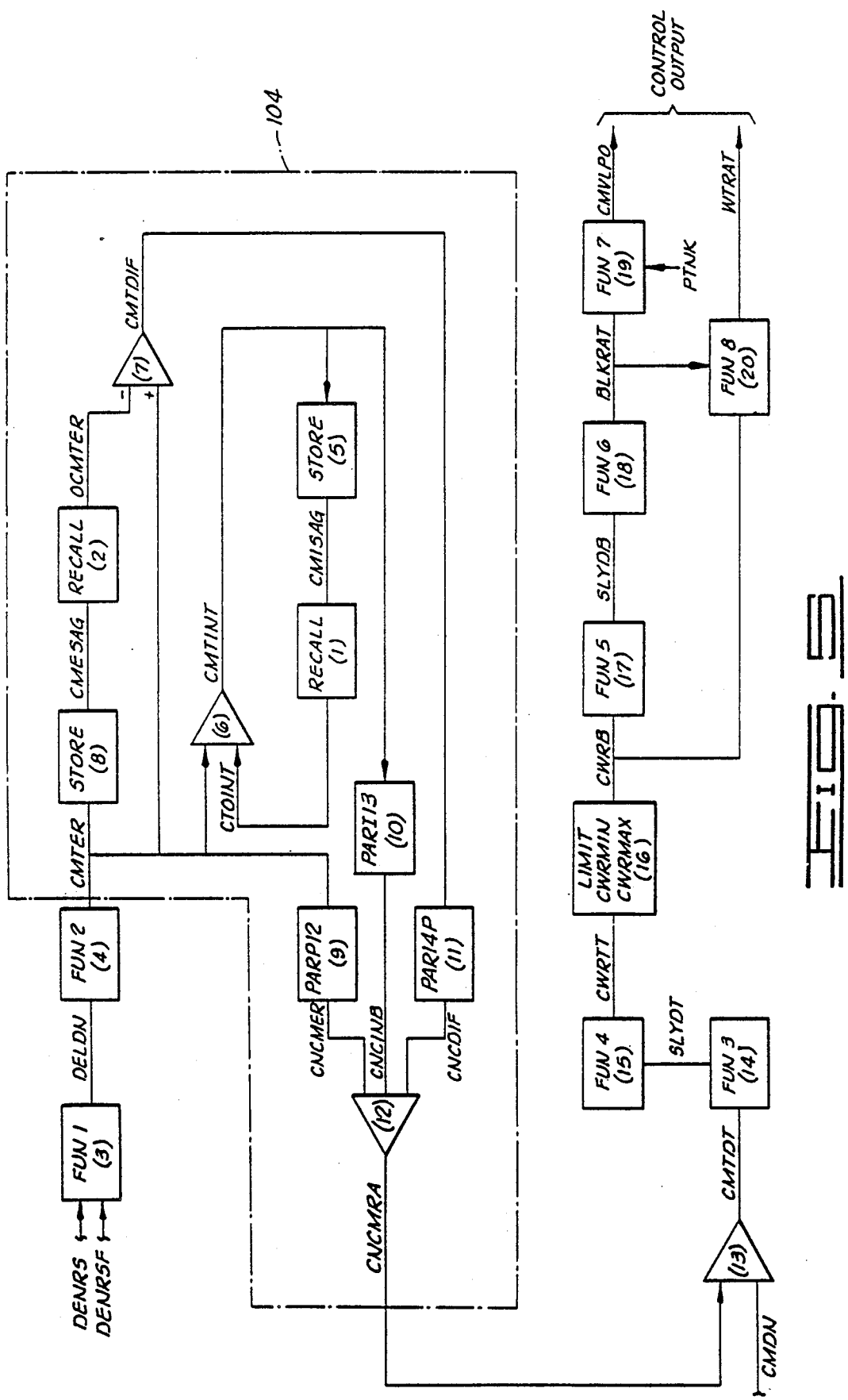

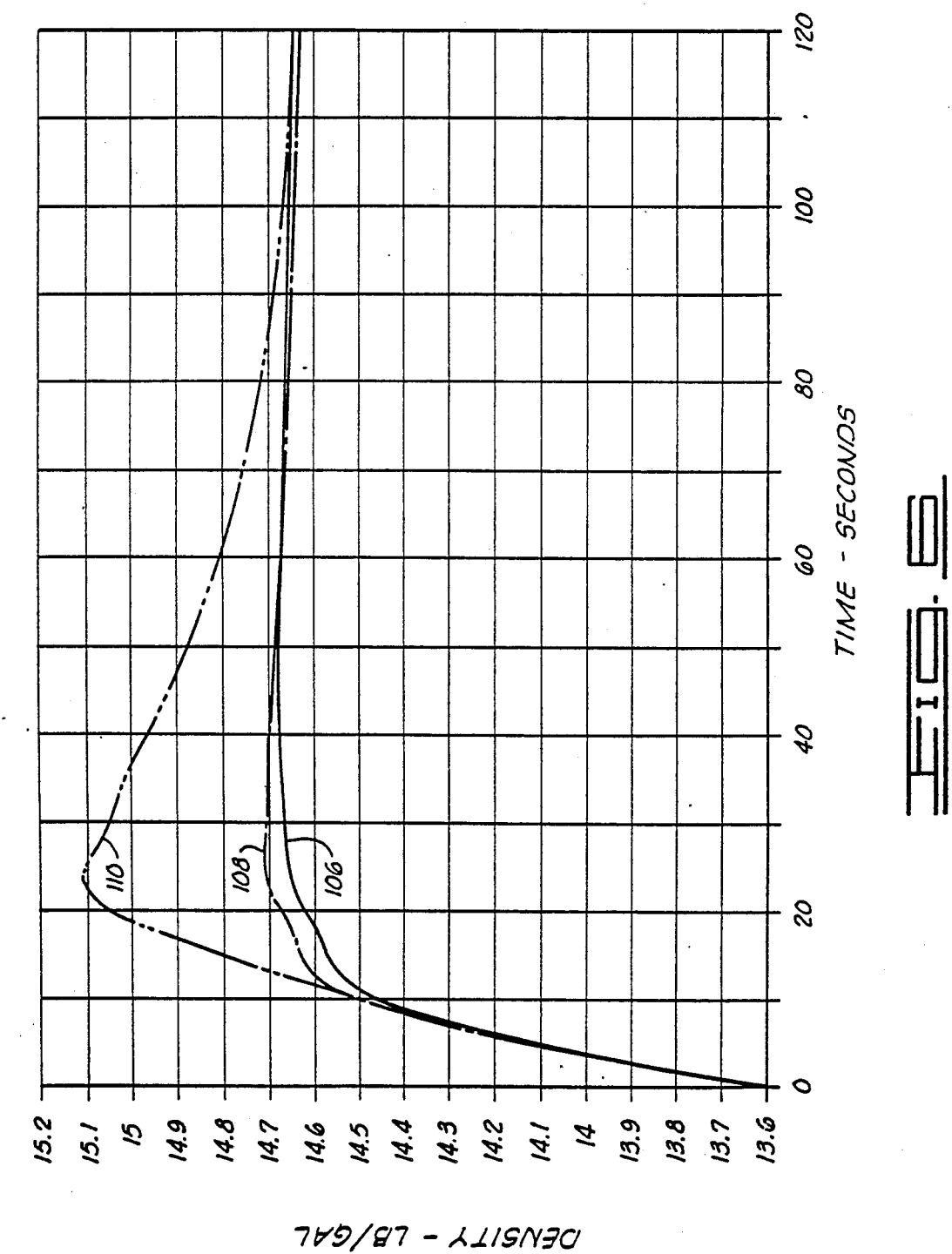

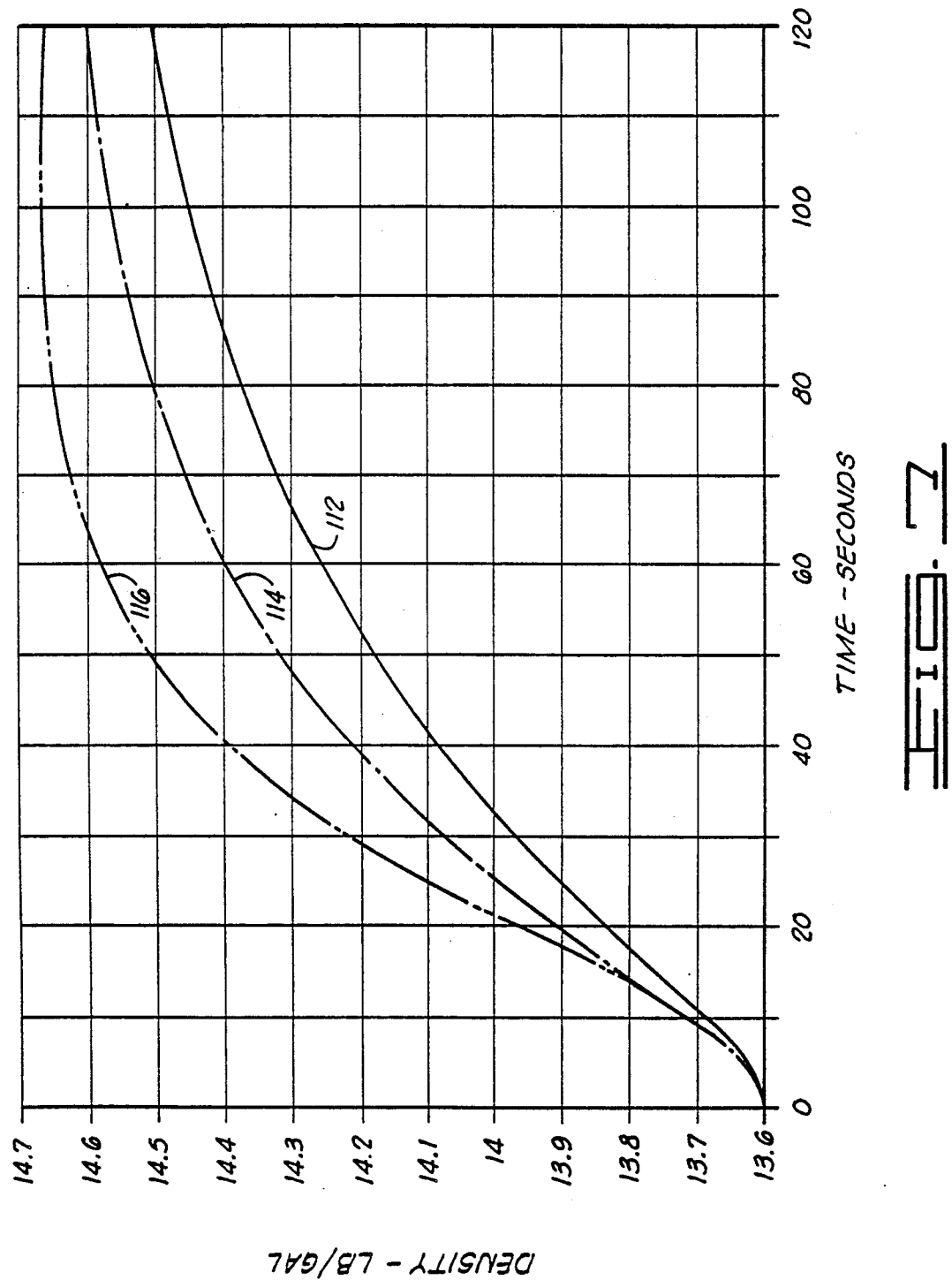

METHOD FOR CEMENTING A WELL

This is a divisional of copending application Ser. No. 07/412,231 filed on Sept. 21, 1989.

BACKGROUND OF THE INVENTION

This invention relates generally to apparatus and methods for mixing at least two substances, such as dry cement and water. This invention relates more particularly, but not by way of limitation, to an apparatus for producing a cement slurry at a well site and to a method of performing a cement job on a well so that a cement slurry is made and placed in the well.

After the bore of an oil or gas well has been drilled, typically a tubular string, referred to as casing, is lowered and secured in the bore to prevent the bore from collapsing and to allow one or more individual zones in the geological formation or formations penetrated by the bore to be perforated so that oil or gas from only such zone or zones flows to the mouth of the well. Such casing is typically secured in the well bore by cement which is mixed at the surface, pumped down the open center of the casing string and back up the annulus which exists between the outer diameter of the casing and the inner diameter of the well bore. Typically a displacement fluid, such as water, is pumped behind the cement to push the cement to the desired location.

The mixture of cement to be used at a particular well usually needs to have particular characteristics which make the mixture, referred to as a slurry, suitable for the downhole environment where it is to be used. For example, from one well to another, there can be differences in downhole pressures, temperatures and geological formations which call for different types of cement slurries. Through laboratory tests and actual field experience, a desired type of cement slurry, typically defined at least in part by its desired density, is selected for a particular job.

Once the desired type of cement slurry has been selected, it must be accurately produced at the well location. If it is not, adverse consequences can result. During the mixing process, slurry density has typically been controlled with the amount of water. Insufficient water in the slurry can result in too high density and, for example, insufficient volume of slurry being placed in the hole. Also, the completeness of the mixing process can affect the final properties of the slurry. A poorly mixed slurry can produce an inadequate bond between the casing and the well bore. Still another example of the desirability of correctly mixing a selected cement slurry is that additives, such as fluid loss materials and retarders, when used, need to be distributed evenly throughout the slurry to prevent the slurry from prematurely setting up. This requires there to be sufficient mixing energy in the slurry mixing process. More generally, it is desirable to obtain a consistent, homogeneous slurry by means of the mixing process. This should be done quickly so that monitored samples of the slurry are representative of the larger volume and so that dry and wet materials are completely or thoroughly combined to obtain the desired slurry.

The foregoing objectives have been known and attempts have been made to try to meet them with continuous mixing systems. In general, these systems initially mix dry cement and water through an inlet mixer which outputs into a tub in which one or more agitators agitates the resulting blend of materials. The process is continuous, with slurry which exceeds the volume of the tub flowing over a weir into an adjacent tub which may also be agitated and from which slurry is pumped down into the well bore. Such systems typically also include some type of recirculation from one or the other of the tubs back into the inlet mixer and the first tub to provide an averaging effect as well as possibly some mixing energy. One or more densimeters are typically used in the systems to monitor density (this is the means the operator uses to determine cement/water ratio), the primary characteristic which is used to determine the nature of the cement slurry. Through this process density averaging occurs in the mixtures in the tubs, with the goal being a slurry having a density within an acceptable tolerance of a desired density. Although more than one densimeter may be used in one or more of these prior systems, there is the need for an improved system wherein multiple recirculations and multiple densimeters responsive to the recirculations are used to enable faster density control.

Despite these continuous mixing systems having significant utility, the oil and gas industry today is seeking systems which provide better mixing than such continuous mixing systems have been able to achieve. It has been observed that in some prior systems the inlet mixer configuration provides inadequate mixing and causes, rather than reduces, air entrainment. Excess air entrainment can adversely affect density measurements which in turn affect control systems and thus resultant slurry properties. Inadequate mixing can also allow "dusting" (escape of unmixed dry cement from the mixer). Other shortcomings of at least some prior continuous mixing systems include the necessity of controlling multiple mixing water valves, and in at least one type of system, one of such valves chokes the water source pressure upstream of where mixing occurs so that much of the mixing energy is lost. At least one prior system includes a primary water inlet valve which has an adjustable conical space that can become clogged by debris in the water.

To try to overcome at least some of the shortcomings of continuous mixing systems alone, batch mixers have been used in combination with continuous mixers. These batch mixers are basically larger volume tubs which provide better averaging of the slurry so that at least better density control may result and possibly better additive distribution. For example, a continuous mixer having a capacity of five to eight barrels may be used to produce a blend which is pumped into fifty-barrel batch mixing tanks.

Although such batch mixing systems may provide some advantages over smaller continuous mixing systems, the batch mixing systems also have shortcomings. In a batch system, the total job volume is typically made before the job starts; therefore, several batch tanks/mixers need to be on location to hold the pre-mixed volume. This requires much equipment and personnel and takes considerable space at the well site.

In view of the aforementioned shortcomings of the continuous or hybrid continuous/batch mixing systems, there is the need for a mixing system which provides the desired fluid property averaging and which permits rapid changes of the desired property to be obtained. It is desirable to obtain such a mixing system in a way which efficiently uses equipment, personnel and space at the well site. Another desirable feature of such an improved system is for it to have additional or better applied mixing energy because there is a desire in the industry to try to have mixing energies which approach the API laboratory mixing energies at which proposed slurries are developed and tested.

Another aspect of prior systems is the use of water or other displacement fluid from displacement tanks for accurately determining how much fluid is pumped behind the cement to place it at a desired location in the well. These displacement tanks are carried on prior mixing system vehicles which typically do not have enough extra space or weight capacities to accommodate a number of mixing tubs. For example, a prior system includes a vehicle on which are mounted a five-barrel mixing tank and two ten-barrel displacement tanks. This vehicle does not have enough room and weight allowance for additional twenty-barrel averaging tanks. Therefore, there is the need for a mixing system which uses the displacement tanks both as averaging containers and as displacement tanks. To permit this without contaminating the displacement fluid (if that would be undesirable), there is also the need for "on-the-fly" washing of the tanks between their averaging and displacement/measurement usages.

In summary, there is the need for an improved mixing system, including both apparatus and method, which provides fast density control while providing fluid process averaging of one or more desired properties (e.g., density). Such a system should also permit the magnitudes of desired properties to be changed quickly. Such a system preferably has increased or better applied mixing energy and can be implemented with existing displacement tanks used both as mixing containers and as displacement tanks.

SUMMARY OF THE INVENTION

The present invention overcomes the above-noted and other shortcomings of the prior art by providing a novel and improved mixing apparatus and a novel and improved mixing method. The present invention provides desired fluid property averaging while also permitting rapid changes of the desired property. The present invention also provides additional or better applied mixing energy relative to earlier systems. In a particular implementation, the present invention provides fast density control. In one embodiment the invention utilizes displacement tanks both as secondary mixing containers and as displacement tanks. This embodiment preferably includes a washing capability so that the displacement tanks can be washed between usages for averaging and for displacement.

The present invention can be used to improve job quality, mix thick slurries at high rates, and reduce the need for batch mixers. Job quality improvements come from better density control, reducing free water content of mixed slurries by increasing mixing energy and providing an averaging tank volume. Thick slurries can be mixed at high rates by using an improved high-energy primary mixer, increasing the rolling action in the mixing containers by using larger and higher horse power agitators and by increasing recirculation rates. The need for batch mixers is obviated because the invention can provide approximately equivalent quality as compared to what has heretofore been obtained with hybrid continuous/batch mixing systems.

In a particular implementation, the present invention includes a primary mixing tub associated with two secondary mixing tubs. Two recirculation circuits, each having its own densimeter, are connected among the three tubs. A special density control algorithm is implemented in a computer control system. The aforementioned advantages are achieved with this system. Using this system, a constant mix rate can be maintained during density adjustments. This new system also allows the operator to input maximum and minimum mixing densities to prevent the system from being overdriven or underdriven too much. It also corrects for poor delivery of at least one of the substances to be mixed. Using this new system, an increased response rate for controlling the density in the secondary tubs is achieved.

More generally, the present invention provides an apparatus for producing an averaged mixture, comprising: a first tub; inlet means for producing and inputting initial mixtures including a first substance and a second substance into the first tub for producing a first averaged mixture within the first tub; a second tub; a third tub; means for selectably directing a portion of the first averaged mixture from the first tub into at least a selected one of the second tub and the third tub for producing a second averaged mixture within the selected at least one of the second tub and the third tub; and means for recirculating at least a portion of each of the first averaged mixture and the second averaged mixture back to the inlet means for mixing with initial mixtures of the inlet means. The apparatus still further comprises control means, responsive to flows through the means for recirculating, for controlling the inlet means to produce desired initial mixtures from which a desired second averaged mixture can be obtained in the selected at least one of the second tub and the third tub.

Stated another way, the present invention provides an apparatus for producing a mixture having a desired density, comprising: flow mixing means for receiving and mixing a first substance and a second substance and for outputting a mixture including the first and second substances; first containment means for containing a body of a first averaged mixture including the mixture received from the flow mixing means; second containment means for containing a body of a second averaged mixture including a portion of the first averaged mixture received from the first containment means; first recirculation means for recirculating at least a portion of the first averaged mixture from the first containment means to the flow mixing means; second recirculation means for recirculating at least a portion of the second averaged mixture from the second containment means to the flow mixing means; and control means for controlling, in response to a desired density and to measured densities of both the recirculated first averaged mixture and the recirculated second averaged mixture, both the first substance and the second substance received and mixed by the flow mixing means so that the second averaged mixture has the desired density.

The present invention also provides a method of controlling the production of a mixture so that the mixture has a desired density, which mixture includes a first substance and a second substance passed through a flow mixer into a first tub and from the first tub into a second tub where the mixture is defined. The method comprises the steps of: recirculating contents of the first tub to the flow mixer; recirculating contents of the second tub to the flow mixer; measuring density of recirculated contents of the first tub; measuring density of recirculated contents of the second tub; controlling the introduction of the first substance into the flow mixer in response to a desired density and both of the measured densities; and controlling the introduction of the second substance into the flow mixer in response to the desired density and both of the measured densities.

A particular aspect of the present invention provides a method of performing a cement job on a well so that a cement slurry is made and placed in the well. The method comprises the steps of: flowing cement and water through a mixture into a tub to provide a first body of cement slurry; flowing a portion of the first body of cement slurry into a displacement tank to provide a second body of cement slurry; flowing the second body of cement slurry from the displacement tank into the well; flowing displacement fluid into the displacement tank; and flowing displacement fluid from the displacement tank into the well behind the cement slurry to place the cement slurry at a desired location in the well. The method of a preferred embodiment further comprises, after the step of flowing the second body of cement slurry from the displacement tank into the well, washing the displacement tank with a washing fluid and flowing used washing fluid from the displacement tank into the tub.

Therefore, from the foregoing, it is a general object of the present invention to provide a novel and improved mixing apparatus and a novel and improved mixing method. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 4, comprising FIGS. 4A and 4B, is a flow chart of a methodology and program of a preferred embodiment of the present invention.

FIG. 5 is a control program flow diagram of a portion of the methodology and program represented in FIG. 4.

FIG. 6 is a graph showing density for a primary mixing tub as a function of time in response to a step input in design density.

FIG. 7 is a graph showing the corresponding density response for a secondary tub.

DETAILED DESCRIPTION OF THE PREFERRED EMBODIMENTS

The present invention broadly provides an apparatus and a method for producing a mixture. The mixture includes a first substance and a second substance, and it can include additional substances. In a preferred embodiment, the mixture is produced so that it has a desired density. In a preferred embodiment, the apparatus and method are used for producing an averaged mixture to be pumped into a well. For simplifying the description herein, the apparatus and method will be specifically described with reference to mixing dry cement and water at a well site to produce a cement slurry having a desired density for pumping downhole; however, it is to be noted that the apparatus and method of the present invention have broader utility beyond these specific substances and this specific environment.

Figure 1:
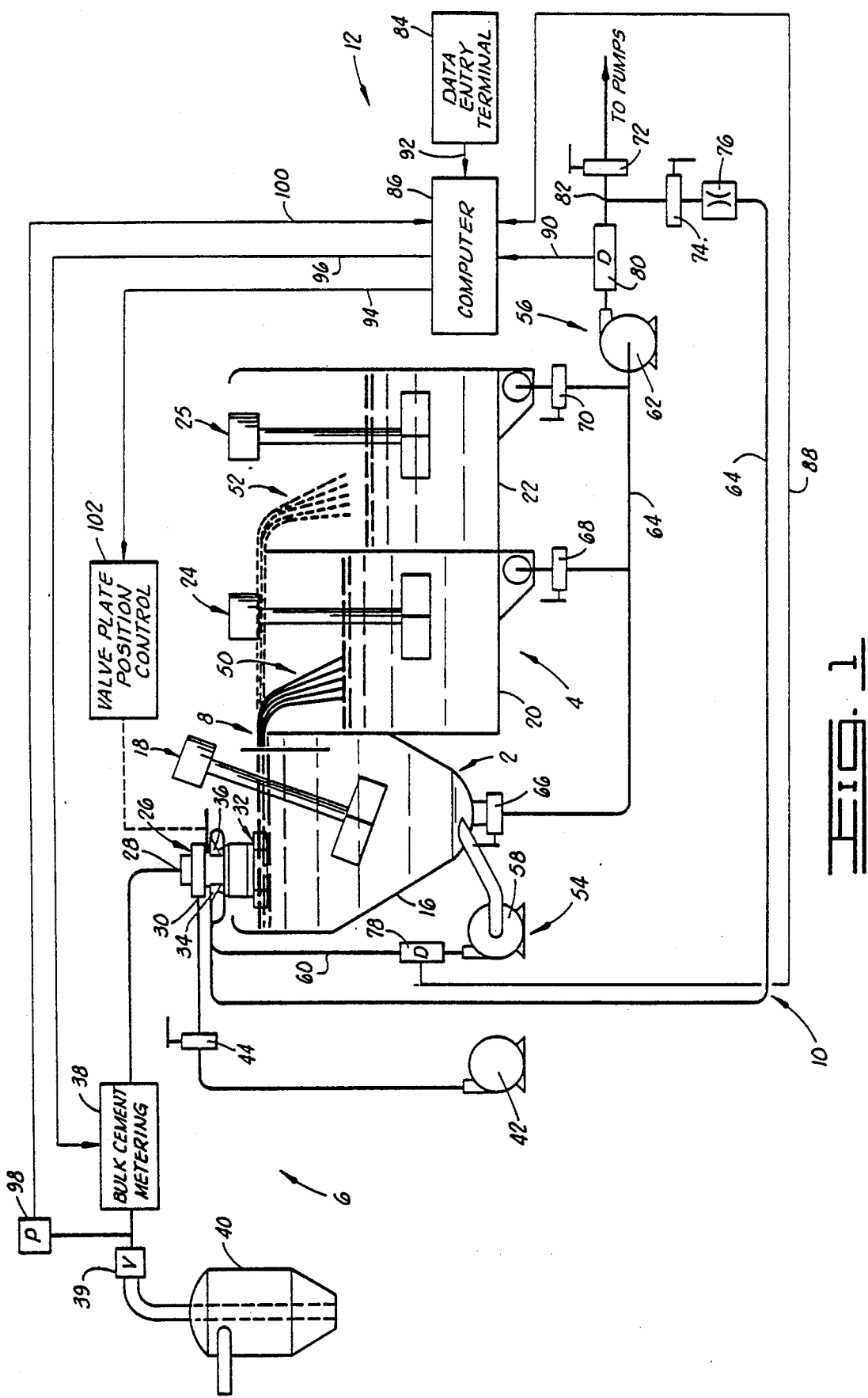
FIG. 1 is a schematic illustration of a preferred embodiment of the apparatus of the present invention.

Referring to FIG. 1, a preferred embodiment of the apparatus of the present invention includes containment means 2 for containing a body of a first averaged mixture. The apparatus also includes containment means 4 for containing a body of a second averaged mixture which includes a portion of the first averaged mixture received from the containment means 2. Connected to the containment means 2 is inlet means 6 for producing initial mixtures including at least two substances and inputting the initial mixtures into the containment means 2 so that the first averaged mixture is produced in the containment means 2. Thus, the first averaged mixture includes mixture received from the inlet means 6.

The apparatus further comprises means 8 for selectably directing a portion of the first averaged mixture from the containment means 2 into the containment means 4 for producing the second averaged mixture within the containment means 4. The apparatus also comprises recirculation means 10 for recirculating at least a portion of each of the first averaged mixture and the second averaged mixture back to the inlet means 6 for mixing with initial mixtures of the inlet means 6. Responsive to flows through the recirculation means 10 is a control means 12 of the apparatus. The control means 12 controls the inlet means 6 to produce desired initial mixtures from which a desired second averaged mixture can be obtained in the containment means 4.

Figure 2:
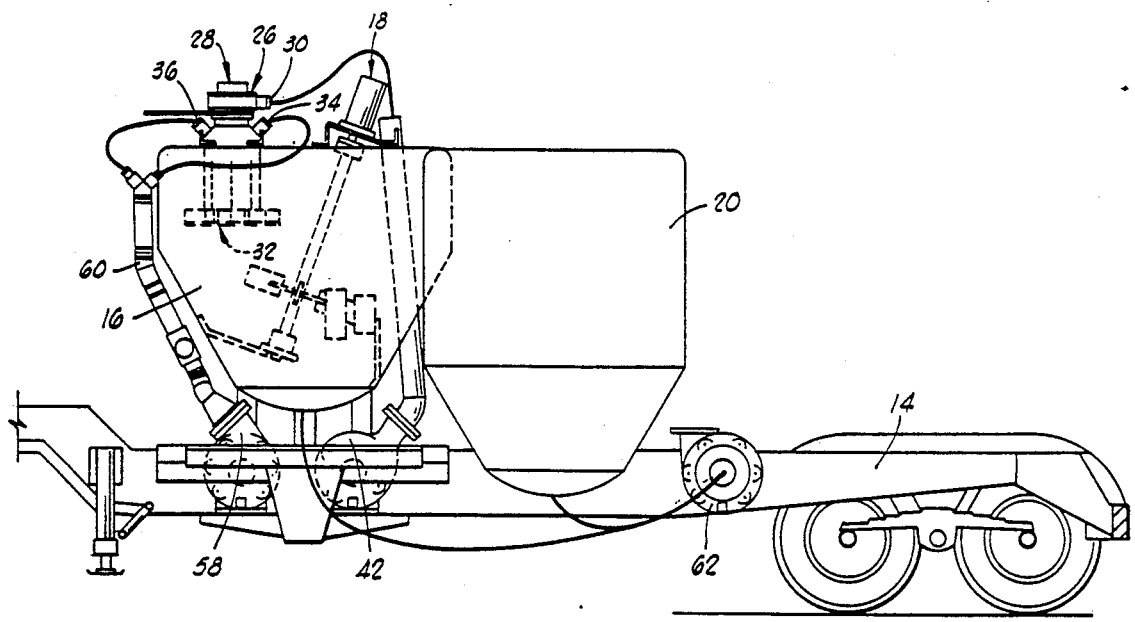
FIG. 2 is an elevational view of components of a preferred embodiment of the apparatus schematically illustrated in FIG. 1.
Figure 3:
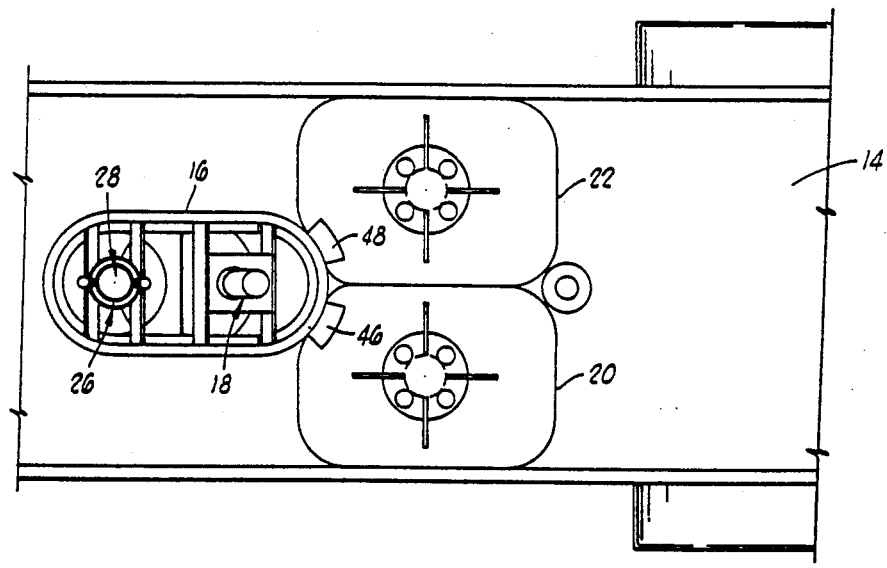
FIG 3 is a plan view of components shown in FIG. 2.

In a preferred embodiment illustrated in FIGS. 2 and 3, the foregoing elements are assembled and mounted on a suitable vehicle 14, such as a trailer which is transportable to a well site. The vehicle 14 is a conventional type adapted for the specific use for which it is intended to be put (e.g., tranporting equipment to a well site).

Each of the aforementioned elements 2-12 will next be more particularly described in the sequence in which they were introduced above.

The containment means 2 includes a primary mixing tub 16 (as used herein, "tub" refers to and encompasses any container suitable for the use to which it is to be put within the context of the overall invention). In a particular embodiment the tub 16 has a five barrel capacity or volume. Disposed in the tub 16 at an angle to the tub's vertical axis is a large agitator 18 by which high rolling action agitation and vibration can be imparted to the mixture in the tub to aid in wetting the cement within the mixture and in expelling air which can be entrained in the mixture. A preferred embodiment tub 16 is more particularly described in a United States patent application entitled Mixing Apparatus, now U.S. Pat. No. 5,046,855, incorporated herein by reference.

Referring to FIGS. 2 and 3 herein, the tub 16 is shown mounted on the vehicle 14. The mounting is by a suitable technique known in the art. As more clearly shown in FIG. 3, the tub 16 is mounted centrally between the two longitudinal sides of the vehicle 14 and adjacent two more mixing tubs 20, 22.

The two tubs 20, 22 define the preferred embodiment of the containment means 4 shown in FIGS. 1-3. Thus, the preferred embodiment of the present invention is a three mixing tub system; however, it is to be noted that various aspects of the present invention have utility with two-tub systems or systems with more than three tubs; therefore, the subsequent description herein regarding the preferred embodiment three-tub system should not be taken as limiting other aspects of the present invention.

The tubs 20, 22 of the preferred embodiment are conventional mixing containers. In a particularly preferred embodiment of the present invention, the tubs 20, 22 are implemented with conventional displacement tanks which are part of a conventional vehicle 14 (for example, the Halliburton Services trailer-mounted RCM TM -75TC4) used in performing cementing jobs at well sites. Such displacement tanks have heretofore been used to hold displacement fluid which is pumped behind a column of cement slurry to push the cement slurry to a desired location in the well bore. The displacement tanks are such that accurate determinations of the volume of displacement fluid pumped behind the cement slurry are obtained for maintaining proper control of the placement of the slurry within the well bore. Using such displacement tanks also as mixing containers allows the vehicle 14 to be modified to implement the present invention and yet stay within the weight limitation of such vehicle 14.

In the specific implementation where the present invention is used to produce a cement slurry at a well site, each of the tubs 20, 22 might have a volume of ten barrels which individually provides adequate capacity and which in combination provides a twenty barrel capacity that is comparable to large capacity containers which have been used in prior systems used to produce cement slurries at well sites. As represented in FIG. 1, large agitators 24, 25, can be disposed in the tubs 20, 22 respectively for providing agitation to the bodies of mixture contained in the respective tubs. As best shown in FIG. 3, the tubs 20, 22 are disposed adjacent each other across the width of the vehicle 14 and also adjacent the centrally located tub 16.

The mixtures which are produced in the tubs 16, 20, 22 result from the initial mixtures which are produced and input by the inlet means 6. In the illustrated preferred embodiment, the inlet means 6 includes flow mixing means 26 for receiving and mixing a first substance and a second substance and for outputting a mixture which includes the first and second substances. In the preferred embodiment the flow mixing means 26 includes a cement inlet 28 for receiving dry cement, a water inlet 30 for receiving water, and a mixture output 32 for outputting a cement slurry of received cement and water into the primary mixing tub 16. This is particularly implemented in the preferred embodiment by an axial flow mixer connected to the tub 16. The axial flow mixer comprises the aforementioned inlets and outlet and further comprises one, and only one, valve through which the water is admitted into the mixture and then into the tub 16. The axial flow mixer has dual recirculating inlets 34, 36 and constant velocity water jets (not shown). The axial flow mixer of the preferred embodiment is more particularly disclosed in the United States patent application entitled Mixing Apparatus, filed concurrently herewith and assigned to the assignee of the present invention. This application is now U.S. Pat. No. 5,046,855, incorporated herein by reference.

The cement inlet 28 of the flow mixer 26 is connected to means for selectably admitting the dry cement into the flow mixer 26. This includes a bulk cement metering device 38, such as a valve of a type known in the art (for example, a conventional bulk control cement head valve). The metering device 38 is shown connected to a bulk surge tank 40 into which dry cement is loaded in a conventional manner. A valve 39 can be included for a purpose described hereinbelow.

The water inlet 30 of the flow mixer 26 is connected to a source of water such as is provided through a conventional pump 42 and a conventional valve 44.

As the flow mixer 26 receives cement and water and initially mixes it and provides it through its output 32 into the tub 16, the tub 16 fills to its capacity. Further input to the tub 16 from the flow mixer 26 causes an overflow from the tub 16. This overflow is communicated over one or more weirs into either or both of the tubs 20, 22. Weirs 46, 48 are illustrated in FIG. 3 and produce the flows 50, 52, respectively, schematically illustrated in FIG. 1. These weirs 46, 48 define in the preferred embodiment the means 8 for selectably directing a portion of the mixture from the tub 16 into the tubs 20, 22. These direct the overflowed averaged mixture from the tub 16 into either or both of the tubs 20, 22 for final mixing, averaging of the mixture density and improving of the distribution of any additives within the final mixture. The means 8 can be constructed so that the overflow from the tub 16 is provided in series first to one of the tubs 20, 22 and then to the other. In this way, one of the tubs 20, 22 can be used to produce a lead cement slurry, and the other of the tubs 20, 22 can be used at a later time to produce a tail cement slurry. Alternatively, the tubs 20, 22 can be used in parallel by overflowing from the tub 16 simultaneously into both of the tubs 20, 22. The means 8 could include something other than weirs, such as a pump for pumping contents of the tub 16 to the tubs 20,22. When the tubs 20, 22 are displacements tanks, it is apparent that use of them in the foregoing manner gives them a dual function in that they are used not only as displacement tanks, but also as averaging tubs in which final cement slurries are produced from the mixture passed into them from the primary mixing tub 16.

To produce the desired densities in the mixtures of the tubs 20, 22 in the manner of the preferred embodiment of the present invention, the recirculation means 10 is used. The recirculation means 10 includes a recirculation subsystem 54 for recirculating at least a portion of the first averaged mixture from the tub 16 to the recirculation inlets 34, 36 of the flow mixer 26 of the inlet means 6. The recirculation means 10 also includes a recirculation subsystem 56 for recirculating at least a portion of the second averaged mixture from the selected one or both of the tubs 20, 22 to the recirculation inlets 34, 36 of the flow mixer 26 of the inlet means 6.

The subsystem 54 includes a pump 58 (for example, a 6×5 centrifugal pump) having an inlet connected to the mixing tub 16 and having an outlet connected to the flow mixer 26. These connections are made through suitable conduit means 60. The subsystem 54 of the preferred embodiment has a recirculation rate two to three times that of a previously conventional system (for example, 25 barrels per minute versus 8-10 barrels per minute). This improves mixing and energy, and it improves control measurement. This subsystem 54 is more particularly described in the United States patent application entitled Mixing Apparatus, filed concurrently herewith and assigned to the assignee of the present invention, now U.S. Pat. No. 5,046,855, incorporated herein by reference.

The recirculation subsystem 56 includes a pump 62 (for example, a 6×5 centrifugal pump). The pump 62 has an inlet connected to at least the two secondary mixing tubs 20, 22. As illustrated in FIG. 1, the inlet is also manifolded to the mixing tub 16 so that the slurry within the first averaged mixture can go directly from the tub 16 to high pressure pumps (not shown) supplied or boosted by the pump 62, to whose outlet the downstream pumps are connected as indicated in FIG. 1. The outlet of the pump 62 is also connected to the flow mixer 26. The connections of the pump 62 to the respective tubs and the flow mixer are made through suitable conduit means 64. Shown disposed in the conduit means 64 are conventional valves 66, 68, 70, 72, 74 and a conventional control orifice 76 (for example, a Red Valve pinch valve). As is apparent from FIG. 1, the flow from the pump 62 is split between the downhole, or out-of-the-apparatus, stream and the recirculation stream when the valves 72, 74 are both open. Thus, the recirculation flow rate equals the difference between the pump rate of the pump 62 and the flow rate downhole through the valve 72. The recirculation provided by the subsystem 56 increases the mixing energy available within the flow mixer 26 above that which would be provided by the subsystem 54 alone.

Reference will now be made to the control means 12. In the preferred embodiment, the control means 12 responds to a desired density for the second averaged mixture to be obtained from one or both of the tubs 20, 22 and to measured densities of both the portion of the first averaged mixture recirculated through the subsystem 54 and the portion of the second averaged mixture recirculated through the subsystem 56. In response, the control means 12 controls the first and second substances received and mixed by the flow mixer 26 so that the second averaged mixture has the desired density.

Referring to FIG. 1, the control means 12 includes density measuring means 78, connected to the pump 58, for measuring density of the mixture pumped by the pump 58 during recirculation. The means 78 produces a signal in response to the density of the first averaged mixture recirculated through the pump 58. In the preferred embodiment the means 78 is implemented by a six-inch densimeter of a type as known in the art (for example, a Halliburton Services radioactive densometer). The densimeter is disposed in the conduit 60 in the embodiment shown in FIG. 1.

The control means 12 also includes density measuring means 80, connected to the pump 62, for measuring density of the cement slurry pumped by the pump 62. The means 80 produces a signal in response to density of the second averaged mixture recirculated through the pump 62. The means 80 in the preferred embodiment includes a conventional densimeter (for example, a Halliburton Services radioactive densometer) disposed in the conduit 64 between the outlet of the pump 62 and a junction 82 where the downhole and recirculation flows split.

The control means 12 further comprises means for entering system design parameters, control tuning factors and job input parameters, including the desired density for the second averaged mixture. Another one of the entered parameters is a desired rate at which the second averaged mixture is to be pumped into the well. The other system parameters and factors are shown in FIG. 4A, which will be further discussed hereinbelow. In the preferred embodiment, the parameter entering means is implemented by a conventional data entry terminal 84 (for example, the keypad of a Halliburton Services UNIPRO II), which interfaces in a known manner to a suitable programmed computer 86 forming another part of the control means 12.

The computer 86 of the preferred embodiment is a digital computer (for example, as is in the Halliburton Services UNIPRO II) which is connected to the densimeters 78, 80 by electrical conductors 88, 90, respectively. The computer 86 is also connected to the data entry terminal 84 by electrical conductor(s) 92. The computer 86 is responsive to electrical signals received over these conductors so that, as programmed, the computer 86 includes means for providing respective control signals over electrical conductors 94, 96 to the valve 38 of the dry cement inlet path and to the water inlet valve of the flow mixer 26. As illustrated in FIG. 1, the computer 86 is also responsive to pressure measured in the dry cement inlet flow by a conventional pressure sensor 98 (for example, a Datamate 0-50 psig pressure transducer). The signal generated by the sensor 98 as a measure of the pressure of the inlet substance is communicated to the computer 86 over one or more electrical conductors 100. In an alternative preferred embodiment, the inlet pressure can be maintained constant, such as by means of the control valve 39 (FIG. 1), so that varying pressure is not a factor in such an embodiment thereby obviating the need for the sensor 98. The valve 39 could typically be a conventional pressure reducing valve for maintaining downstream pressure constant while upstream pressure varies.

The means provided by the programmed computer 86 more particularly comprises means for performing initial calculations in response to system design parameters, control tuning factors and job design parameters entered through the data entry terminal 84. The means provided by the programmed computer 86 further comprises means for generating, in response to entered system design parameters, control tuning factors and job design parameters and in response to initial calculations and measured densities, a control signal for a first one of the substances passed through the inlet means 6 and a control signal for a second one of the substances passed through the inlet means 6. In the illustrated preferred embodiment, this includes means for computing a calculated density error and for generating the control signals in response to the calculated density error. More particularly, there is a means for generating one signal to control the valve 38 by which the dry cement is selectably admitted to the flow mixer 26, and a means for generating one signal to control the valve of the flow mixer 26 through a conventional valve plate position control device 102 (for example, a proportional positioner, such as the Vickers XPERT DCL, a compact electrohydraulic package for digital control of linear drives).

The foregoing means of the programmed computer 86 are implemented by the programming and operation indicated in the flow charts of FIGS. 4 and 5. The first two boxes of the flow chart in FIG. 4A identify and describe the self-explanatory system design parameters, control tuning factors and job input parameters which are entered through the data entry terminal 84. The values for CTDNMX and CTDNMN are selected based on operator knowledge. The next box of FIG. 4A and the first box in FIG. 4B contain the equations for the initial calculations performed within the programmed computer 86. The first six listed equations are specific to each slurry design. The first three equations shown in FIG. 4B are proportional, integral and differential factors, respectively. In the illustrated preferred embodiment, the proportional factor PARP12 decreases in response to increasing the entered rate SLR; the integral factor PARI13 increases in response to increasing SLR; and the differential factor PARD14 decreases in response to increasing SLR. These relationships and the specific values shown in FIG. 4B were empirically derived from computer simulations and are not limiting of the present invention. That is, the present invention in its broader aspects is not limited to particular computational factors or processes.

From the initial calculations and entered factors and parameters, along with the measured parameters sampled at an interval defined as TSAMP indicated in the fourth box of FIG. 4 (i.e., DENRS, DENRSF, and PTNK listed in FIG. 4B; the WTRATE signal is not implemented or used in the subsequent calculations, but it can be provided as a verification feedback signal), the production of the cement slurry is controlled using the formulas identified in the second box of FIG. 4B. Of particular importance is the base equation defining the calculated density error, DELDN. This is listed as equation (3) in FIG. 4B. This is the initial equation shown in the flow chart of FIG. 5 which shows the methodology by which the equations listed in FIG. 4B are implemented. The parenthetical numbers shown within the boxes of FIG. 5 correspond to the numbered equations in FIG. 4B.

As shown in FIG. 5, the calculated density error, DELDN, uses the density measurements from both densimeters 78, 80 (DENRS, DENRSF, respectively). From equation (3) in FIG. 4B, DELDN also uses: the entered desired mix density, DENSN; the entered volumes, TUBV and TUBV2, of the primary and secondary mixing tubs; the entered total secondary mixing tub recirculating pump rate, RRP2, of the pump 62; and the entered slurry mix rate, or rate at which the slurry is to be pumped out of the apparatus, SLR (stated another way, RRP2−SLR is the net amount recirculated from the secondary tub and RRP2 is the net flow from the primary tub to the secondary averaging/mixing tub when there is continuous full circulation through the system). These are arithmetically combined to define DELDN as: DENSN−DENRS+(DENSN−DENRSF)*(TUBV2/TUBV)*(RRP2−SLR)/RRP2=[difference between the desired density and the measured density of recirculated flow through the subsystem 54]+[difference between the desired density and the measured density of recirculated flow through the subsystem 56, adjusted by the ratio of the secondary tub volume to the primary tub volume and by the proportion recirculated by the pump 62].

The cement error, CMTER, is calculated from the calculated density error. The cement error is then processed through proportional, integral, differential (PID) error computations of known type but utilizing in the preferred embodiment the aforementioned proportional, integral and differential factors (PARP12, PARI13, PARD14). The differential error computation is also a function (specifically, a hyperbolic function in the preferred embodiment) of the absolute value of the calculated density error, DELDN, as shown in FIG. 4B by the two unnumbered equations between equations (10) and (11). This is implemented by the portion 104 of the flow chart shown in FIG. 5. The cement correction factor, CNCMRA, produced from the PID function 104 is added to the desired cement rate, CMDN, from the "initial calculations" to produce the corrected desired cement rate, CMTDT. This value is processed through the remainder of the functions illustrated in FIG. 5 to produce the cement valve position control signal, CMVLPO, and the water valve position control signal, WTRAT. These two signals produce an overdriving or underdriving of the initial mixtures through the flow mixer 26 to obtain more rapidly the desired density in the second averaged mixture of the secondary tubs 20, 22. To prevent such overdriving or underdriving from being too severe, whereby inadequate mixing of the cement and water might result, limits are placed through the bounding function of equation (16) (FIG. 4B). The bounding is set with the entry of CTDNMX and CTDNMN, the valves of which are selected by the operator from his or her experience.

Although the CMVLPO and WTRAT signals are the control signals by which the computer 86 controls the inlet means 6, the computer 86 also is programmed in the preferred embodiment to compute the value NDENS identified as equation (21) in FIG. 4B. This value is the calculated theoretical density of the initial mixture provided by the flow mixer 26. That is, it is the calculated result which should be obtained from the application of the CMVLPO and WTRAT control signals to the valve 38 and the valve of the flow mixer 26, respectively.

The foregoing is implemented through software programming which is in the known ACSL language by Mitchell & Gauthier Associates. Specific values for parameters of a particular embodiment are listed in the Appendix hereof. Mnemonics in the programming depicted in the drawings, such as RSW means "real switch," are known within the language or otherwise selected and defined by the associated operators or equations.

The various parameters and factors can be changed according to particular usages. For example, control gain factors would need to be changed between using the secondary tubs alternately and in parallel. The system could be designed to provide a signal indicating the type of operation, from which signal the computer could implement the needed parameter/factor change. As another example, the PID values of PAR12, PAR13 and PAR14 could be made variable rather than fixed. The variation could be a function of DELDN, SLR or other value. Such a change would preferably be implemented to obtain the best system performance.

Comparisons of operation between the present invention and other systems are shown in FIGS. 6 and 7. FIG. 6 shows the density response in the primary tub of the systems as a function of time to a step input of 13.6 to 14.6 pounds/gallon in design density. Curve 106 illustrates the response of a system without a recirculation line or a secondary densimeter. Curve 108 illustrates the response of a system with a recirculation line. Curve 110 shows the response of the preferred embodiment of the present invention utilizing both recirculation lines and densimeters.

The graphs of FIG. 7 show the resulting densities in the secondary averaging tubs of the systems, where curve 112 is for a system without recirculation line or secondary densimeter, curve 114 is for a system with recirculation line but without secondary densimeter, and curve 116 is for a system of the present invention with both of the recirculation lines and densimeters.

From the graphs of FIGS. 6 and 7 it can be seen that the system of the present invention, utilizing both recirculation lines in combination with respective densimeters (curves 110, 116), drives the contents of the primary tub to a much higher density to average out with the contents of the secondary tub, thereby providing means for achieving faster secondary tub response.

From the foregoing, it should be apparent that significant features of the present invention include the use of a second recirculation line and a second densimeter, particularly when applied in the calculated density error, DELDN. Maximum and minimum mix density values which are inputted to bound the overdriving or underdriving allows the system to make faster corrections without exceeding the ability of the system to mix at the correction density values. The present invention also operates in accordance with the foregoing to maintain a constant mix rate even though corrections are being made. This is achieved by controlling both, rather than only one of, the dry cement and water inlet flows. For the embodiment shown in FIG. 1, the system also controls in response to the bulk cement delivery pressure to allow corrections of the cement valve delivery factor to be made on the fly. Over a given tank delivery, the bulk delivery pressure typically declines significantly and actual delivery of the bulk substance declines commensurately. Thus, the calibration factor of the cement valve needs to be continually corrected. As previously mentioned, this can be obviated if constant pressure is maintained in the delivery system.

From the foregoing, it is apparent that the present invention includes means for controlling the inlet means 6 in response to the calculated density error, DELDN. The control means also includes means for overdriving or underdriving the flow mixing means 26 to produce in the first averaged mixture within the tub 16 excess or deficient density which is within a range between a predetermined maximum density, CTDNMX, and a predetermined minimum density, CTDNMN. The control means also controls the first substance and the second substance so that the flow mixing means 26 outputs the mixture at a constant rate.

The foregoing preferred embodiment of the apparatus of the present invention can be used to implement the method of the present invention by which the production of the mixture is controlled so that the mixture has a desired density. The mixture includes at least two substances passed through a flow mixer into a first tub and from the first tub into a second tub where the mixture is defined. Correlating this to the illustrated embodiment, the method comprises the steps of recirculating contents of the tub 16 to the flow mixer 26; recirculating contents of one or both of the tubs 20, 22 to the flow mixer 26; measuring with the densimeter 78 the density of the recirculated contents of the tub 16; measuring with the densimeter 80 the density of recirculated contents of the tub(s) 20, 22; controlling the introduction of water into the flow mixer 26 in response to the desired density and both of the measured densities; and controlling the introduction of dry cement into the flow mixer 26 in response to the desired density and both of the measured densities. For the illustrated embodiment shown in FIG. 1, which incorporates the pressure sensor 98 for measuring pressure of the dry cement prior to it passing into the flow mixer 26, the step of controlling the introduction of the dry cement into the flow mixer 26 is also responsive to the measured pressure.

Preferably, the steps of controlling the introduction of the two substances are performed to control them relative to each other so that a constant mix rate is maintained. It is also preferred that these two steps be performed to control the introduction of the substances relative to each other so that the density of a mixture from the flow mixer is within a range between a predetermined maximum density value and a predetermined minimum density value.

In accordance with the preferred embodiment apparatus, the corresponding preferred method includes, within the step of recirculating contents of the tub(s) 20, 22, pumping contents of the tub(s) 20, 22 with a pump at a known pump rate, RRP2. The steps of measuring density respectively include: producing a signal, DENRS, in response to density of recirculated contents of the tub 16; and producing a signal, DENRSF, in response to density of recirculated contents of the tub(s) 20, 22. The preferred method further comprises performing the two controlling steps concurrently, including: entering the desired density, DENSN, into the digital computer 86; entering into the digital computer 86 a desired rate, SLR, at which the mixture is to be pumped from the tub(s) 20, 22 for use other than being recirculated; computing in the digital computer 86 a calculated density error, DELDN, wherein: $DELDN = DENSN - DENRS + (DENSN - DENRSF) * (TUBV2/TUBV) * (RRP2 - SLR)/RRP2$, where TUBV is the volume of the tub 16 and TUBV2 is the volume of the tub(s) 20, 22; and generating with the digital computer 86, in response to the calculated density error, control signals for controlling the introduction of the water and dry cement into the flow mixer 26.

A more particular embodiment of the method of the present invention is one for performing a cement job on a well so that a cement slurry is made and placed in the well using conventional displacement tanks for the dual purposes of being secondary mixing containers and subsequently conventional displacement tanks. This method includes flowing cement and water through a mixer into a tub to provide a mixture constituting a first body of cement slurry. As previously described, this is implemented in the illustrated apparatus by controlling both the valve 38 through which the cement flows and the valve of the flow mixer 26 through which the water flows into the mixer. This occurs in response to measured densities of the recirculated portions of the first body of cement slurry and a second body of cement slurry created by flowing a portion of the first body of cement slurry into a displacement tank.

As illustrated in FIGS. 1-3, for the preferred embodiment apparatus, the creation of the first body of mixture occurs by flowing dry cement through the valve 38 into the flow mixer 26 which is connected to the tub 16 mounted on the vehicle 14 located at a well (not shown). Water is flowed through the valve in the flow mixer 26. These flows are controlled by controlling the respective valves in response to measured densities of the recirculated mixtures.

To form the cement slurry in the displacement tank(s) 20, 22, at least part of the collected mixture from the tub 26 is flowed into at least one of two displacement tanks 20, 22 mounted on the vehicle 14 so that cement slurry is in at least one of the displacement tanks. Cement slurry from the displacement tank or tanks is flowed into the well. This is done by pumping initially with the pump 62 for the embodiment of the apparatus shown in FIG. 1 and subsequently by pumping with downstream high pressure pumps of types known in the art (not shown).

Once slurry has been removed from a displacement tank, displacement fluid is flowed into the displacement tank and the displacement fluid is thereafter flowed, using the pump 62 and the high pressure pumps, from the displacement tank into the well behind the cement slurry to place the cement slurry at a desired location in the well. If the displacement fluid is chemically reactive with the cement slurry, the displacement tank is first washed before it is filled with the displacement fluid. An example of how the displacement tank can be washed includes using a rotating nozzle of an automatic wash system which jets water along the inner surface of the displacement tank. The dirty wash water can be pumped by the pump 62 through the recirculation circuit 56 back into the flow mixer 26 and the tub 16 as part of the water added to the mixture which is continuing to be made.

When at least two displacement tanks are used, as illustrated in FIGS. 1–3, one displacement tank can be washed and used in its conventional manner while the other displacement tank is being used as the secondary averaging tub. If washing is needed, the method includes washing the displacement tank with washing water; flowing the washing water from the displacement tank for combining the washing water with cement and water flowing through the mixer 26 into the tub 16 to add to the first body of cement slurry or mixture within the tub 16; flowing a portion of the added-to first body of cement into the other displacement tank to provide another body of cement slurry; flowing this other body of cement slurry from the other displacement tank into the well; washing with more washing water the other displacement tank from which the other body of cement slurry was flowed and flowing such more washing water into the tub 16; and flowing displacement fluid into this washed displacement tank. Both tanks can then be used in their conventional manners for flowing displacement fluid into the well. The wash water returned from the other, second displacement tank can be pumped into the tub 16 using the pump 62 and held in the tub 16 since no further mixing is likely to occur for that particular job. The displacement tanks are then both available for holding displacement fluid which is to be pumped behind the cement slurry which has been completely pumped from the apparatus of the present invention.

From the foregoing, it is apparent that the present invention provides fluid property averaging. In the particular embodiments, cement is mixed in a primary tub and then averaged in one or more downstream secondary tubs. The averaging is for the purpose of averaging density fluctuations and additive concentrations in the preferred embodiments.

The present invention also provides additional mixing and increased energy relative to prior systems of which I am aware. With high horsepower agitators in the secondary averaging tubs and a second recirculation pump in the system, mixing energy is significantly increased.

The present invention also provides fast density control. With an input from an additional densimeter in the second recirculation loop, an improved control program allows improved and faster density response.

In the particular embodiment combining averaging and displacement tank functions, the present invention eliminates the need for the conventional averaging tubs. The functions of averaging and displacement measurement can be combined into a single dual purpose tank system.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

APPENDIX
EXAMPLES OF SPECIFIC VALUES FOR PARAMETERS USED
IN THE DRAWINGS

| | |
|---|---|
| CONSTANT SLDYD = 1.5 | $ "SLURRY YIELD DESIGN PT., FT3/SKCMT" "(PER SK OF CMT, NOT SK OF BULK)" |
| CONSTANT WTRGAL = 5. | $ "WATER REQUIRED FOR SLURRY, GAL/SK" |
| CONSTANT CMTWT = 94. | $ "WT OF SK OF CMT (NOT BULK), LB" |
| CONSTANT SPGR = 0.998176 | $ "SP GR OF MIX WTR" |
| CONSTANT DENSN = 13.6 | $ "DESIRED MIX DENSITY, LB/GAL" |
| CONSTANT CTDNMX = 17. | $ "MAX MIXING DENSITY (W/O TROUBLE), LB/GAL" |
| CONSTANT CTDNMN = 11. | $ "MIN MIXING DENSITY, LB/GAL" |
| CONSTANT SLR = 10. | $ "SLURRY MIX RATE (INPUT), BBL/MIN" |
| CONSTANT RRP2 = 15. | $ "SECOND TUB RECIRC RATE, BBL/MIN" |
| CONSTANT TUBV = 5.0 | $ "PRIMARY TUB VOLUME, BBL" |
| CONSTANT TUBV2 = 10. | $ "SECONDARY TUB VOLUME, BBL" |
| CONSTANT K3 = 1. | $ "VAL POS UNIT/(LB/SEC OF BULK DEL)" |
| CONSTANT PAR12 = 1.0 | $ "CMT P COEFFICIENT" |
| CONSTANT PAR13 = 0.0168 | $ "CMT I COEFFICIENT" |
| CONSTANT PAR14 = 1.0 | $ "CMT D COEFFICIENT" |

What is claimed is:

1. A method of performing a cement job on a well so that a cement slurry is made and placed in the well, said method comprising the steps of:
   (a) flowing cement and water through a mixer into a tub to provide a first body of cement slurry;
   (b) flowing a portion of the first body of cement slurry into a displacement tank to provide a second body of cement slurry;
   (c) flowing the second body of cement slurry from the displacement tank into the well;
   (d) flowing displacement fluid into the displacement tank; and
   (e) flowing displacement fluid from the displacement tank into the well behind the cement slurry to place the cement slurry at a desired location in the well.

2. A method as defined in claim 1, further comprising recirculating at least portions of the first and second bodies of cement slurry through the mixer.

3. A method as defined in claim 2, wherein said step of flowing cement and water includes controlling both a valve through which the cement flows and a valve through which the water flows into the mixer in response to measured densities of the recirculated portions of the first and second bodies of cement slurry.

4. A method as defined in claim 1, further comprising, after said step (c), washing the displacement tank with a washing fluid and flowing used washing fluid from the displacement tank into the tub.

5. A method as defined in claim 1, wherein:
said method further comprises, after said step (c):
- washing the displacement tank with washing water;
- flowing the washing water from the displacement tank so that the washing water combines with cement and water flowing through the mixer into the tub to add to the first body of cement slurry;
- flowing a portion of the added-to first body of cement into another displacement tank to provide a third body of cement slurry;
- flowing the third body of cement slurry from the respective displacement tank into the well;
- washing with more washing water the displacement tank from which the third body of cement slurry was flowed, and flowing such more washing water into the tub; and
- flowing displacement fluid into the washed displacement tank from which the third body of cement slurry was flowed; and said step (e) includes flowing displacement fluid from both displacement tanks.

6. A method of performing a cement job on a well so that a cement slurry is made and placed in the well, said method comprising:

- flowing dry cement through a valve into a flow mixer connected to a tub mounted on a vehicle located at the well;
- flowing water through a valve in the flow mixer;
- collecting in the tub a mixture of the cement and water from the flow mixer;
- flowing at least part of the collected mixture from the tub into at least one of two displacement tanks mounted on the vehicle so that cement slurry is in at least one of the displacement tanks;
- recirculating mixture from the tub and cement slurry from the at least one displacement tank back to the flow mixer;
- pumping cement slurry from the at least one displacement tank into the well;
- washing the at least one displacement tank after the cement slurry has been pumped therefrom;
- filling the washed at least one displacement tank with displacement fluid;
- pumping displacement fluid from the at least one displacement tank into the well behind the cement slurry; and
- wherein said steps of flowing dry cement and flowing water include controlling the respective valves in response to measured densities of the recirculated mixture and cement slurry.

* * * * *